US005469535A

United States Patent [19]

Jarvis et al.

[11] Patent Number: 5,469,535

[45] Date of Patent: Nov. 21, 1995

[54] THREE-DIMENSIONAL, TEXTURE MAPPING DISPLAY SYSTEM

[75] Inventors: Eugene Jarvis; Eric L. Pribyl, both of Chicago, Ill.

[73] Assignee: Midway Manufacturing Company, Chicago, Ill.

[21] Appl. No.: 878,151

[22] Filed: May 4, 1992

[51] Int. Cl.[6] .......... G06T 15/70

[52] U.S. Cl. .......... 395/130

[58] Field of Search .......... 395/130, 125, 395/128, 129, 127, 119

[56] References Cited

U.S. PATENT DOCUMENTS

| | | | |
|---|---|---|---|
| 5,224,208 | 6/1993 | Miller, Jr. et al. | 395/125 |
| 5,225,360 | 10/1993 | Peaslee et al. | 395/162 |
| 5,317,689 | 5/1994 | Nack et al. | 395/163 |

*Primary Examiner*—Heather R. Herndon

*Assistant Examiner*—Mike Smith

*Attorney, Agent, or Firm*—Rockey, Rifkin and Ryther

[57] ABSTRACT

A three-dimensional, texture mapping display system for displaying three-dimensional projected polygons with texture map on a two-dimensional raster display screen includes a host processor and a graphics co-processor. The host processor is responsive to input data from a host memory defining an overall image that is to be displayed on a three-dimensional form on a raster display device for generating command signals, screen coordinates on the display device, and corresponding texture space coordinates on a texture memory. The graphics co-processor is responsive to the command signals, screen coordinates, and corresponding screen space coordinates for determining destination addresses for each pixel on the screen space of the display device and for determining a corresponding source address applying surface texture data to the image for each destination address. The graphics co-processor includes a look-up table for storing Z-mapping function values so as to provide delta and acceleration values in texture space which can be used to determine the source addresses.

7 Claims, 4 Drawing Sheets

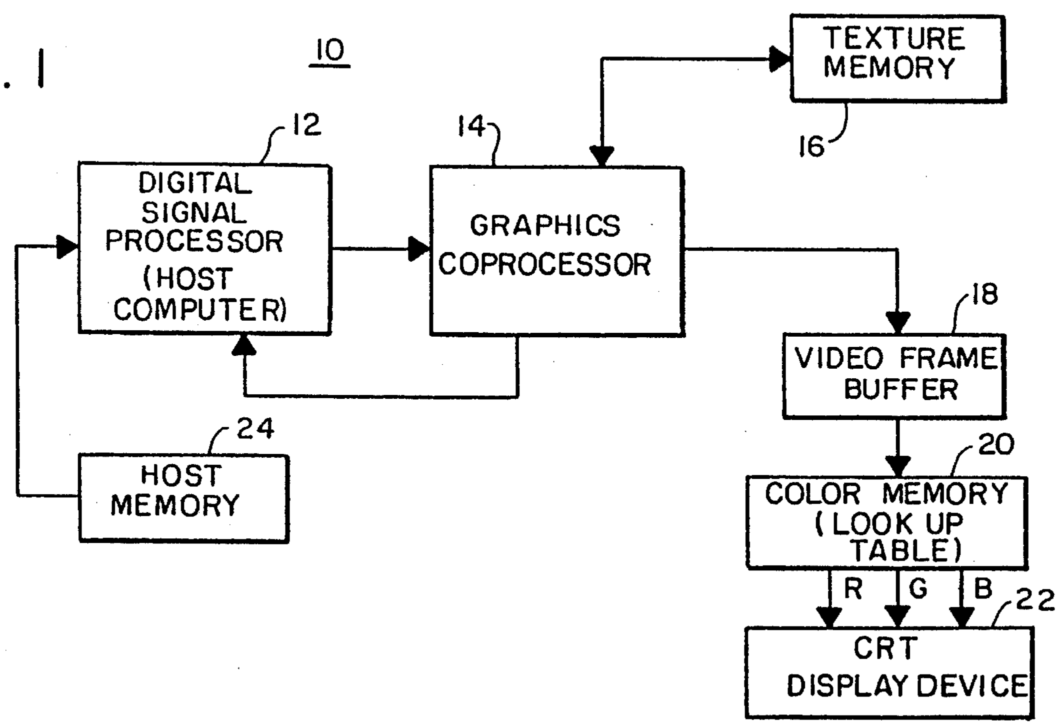
FIG. 1
10
TEXTURE MEMORY
16
12
14
DIGITAL SIGNAL PROCESSOR (HOST COMPUTER)
GRAPHICS COPROCESSOR
18
VIDEO FRAME BUFFER
24
HOST MEMORY
20
COLOR MEMORY (LOOK UP TABLE)
R
G
B
22
CRT DISPLAY DEVICE

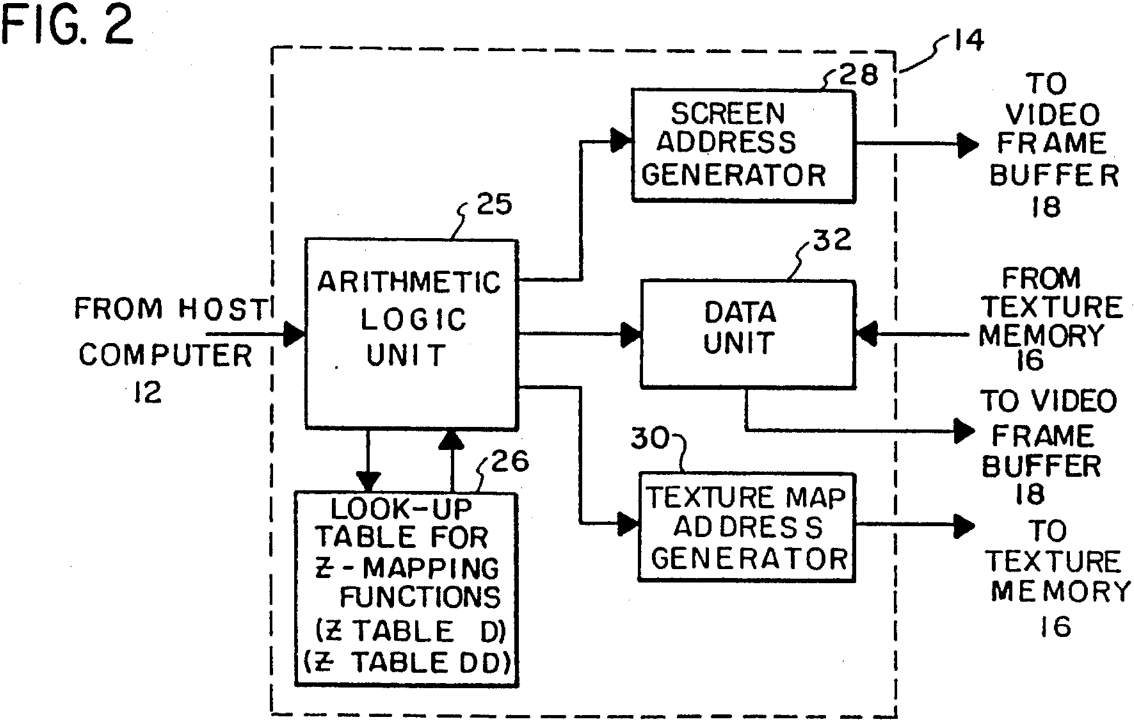
FIG. 2
14
28
SCREEN ADDRESS GENERATOR
TO VIDEO FRAME BUFFER 18
25
ARITHMETIC LOGIC UNIT
32
DATA UNIT
FROM HOST COMPUTER 12
FROM TEXTURE MEMORY 16
TO VIDEO FRAME BUFFER 18
30
26
LOOK-UP TABLE FOR Z-MAPPING FUNCTIONS (Z TABLE D) (Z TABLE DD)
TEXTURE MAP ADDRESS GENERATOR
TO TEXTURE MEMORY 16

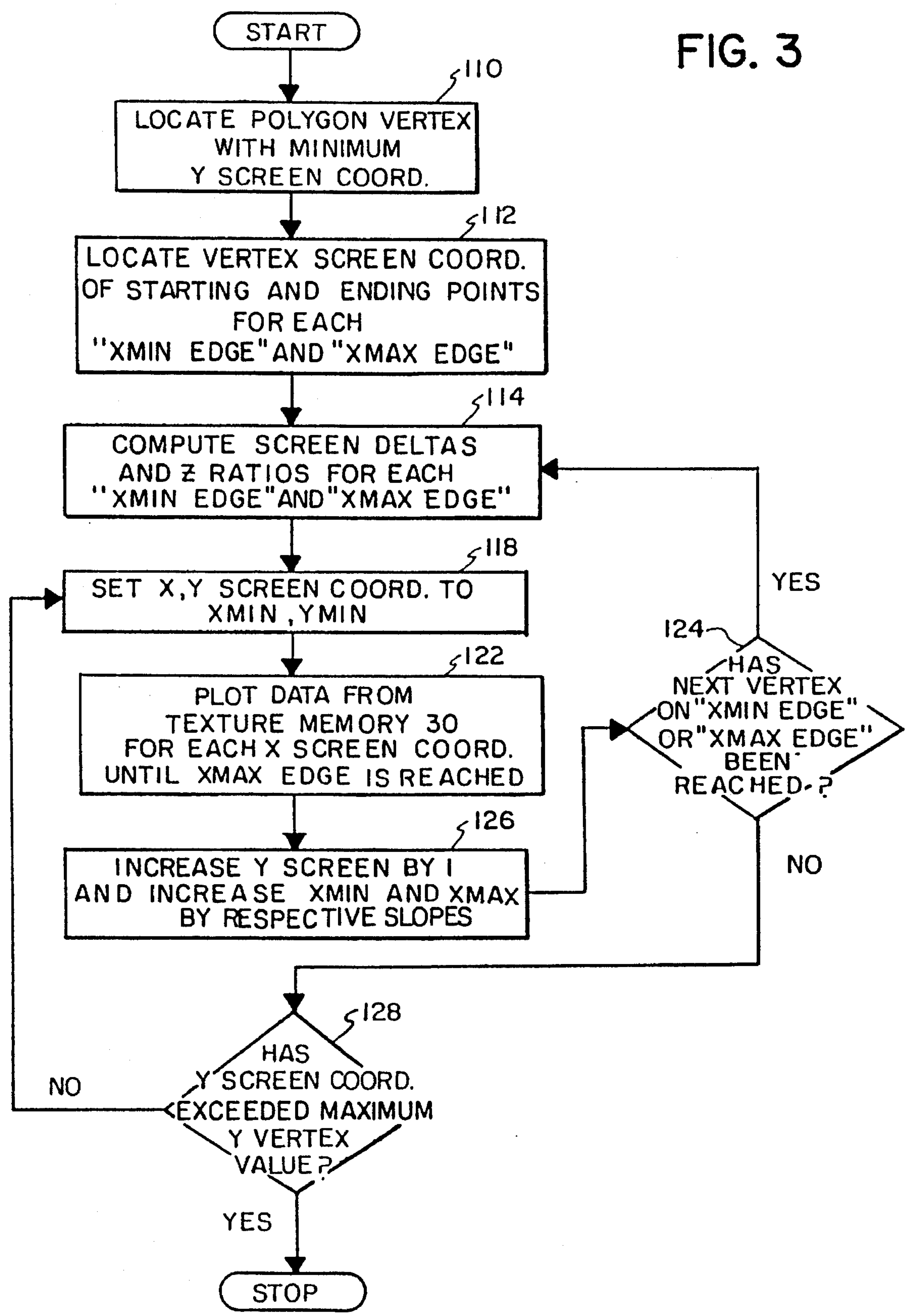
FIG. 3
START
110
LOCATE POLYGON VERTEX WITH MINIMUM Y SCREEN COORD.
112
LOCATE VERTEX SCREEN COORD. OF STARTING AND ENDING POINTS FOR EACH "XMIN EDGE" AND "XMAX EDGE"
114
COMPUTE SCREEN DELTAS AND Z RATIOS FOR EACH "XMIN EDGE" AND "XMAX EDGE"
118
SET X,Y SCREEN COORD. TO XMIN, YMIN
122
PLOT DATA FROM TEXTURE MEMORY 30 FOR EACH X SCREEN COORD. UNTIL XMAX EDGE IS REACHED
126
INCREASE Y SCREEN BY I AND INCREASE XMIN AND XMAX BY RESPECTIVE SLOPES
124
HAS NEXT VERTEX ON "XMIN EDGE" OR "XMAX EDGE" BEEN REACHED ?
YES
NO
128
HAS Y SCREEN COORD. EXCEEDED MAXIMUM Y VERTEX VALUE ?
NO
YES
STOP

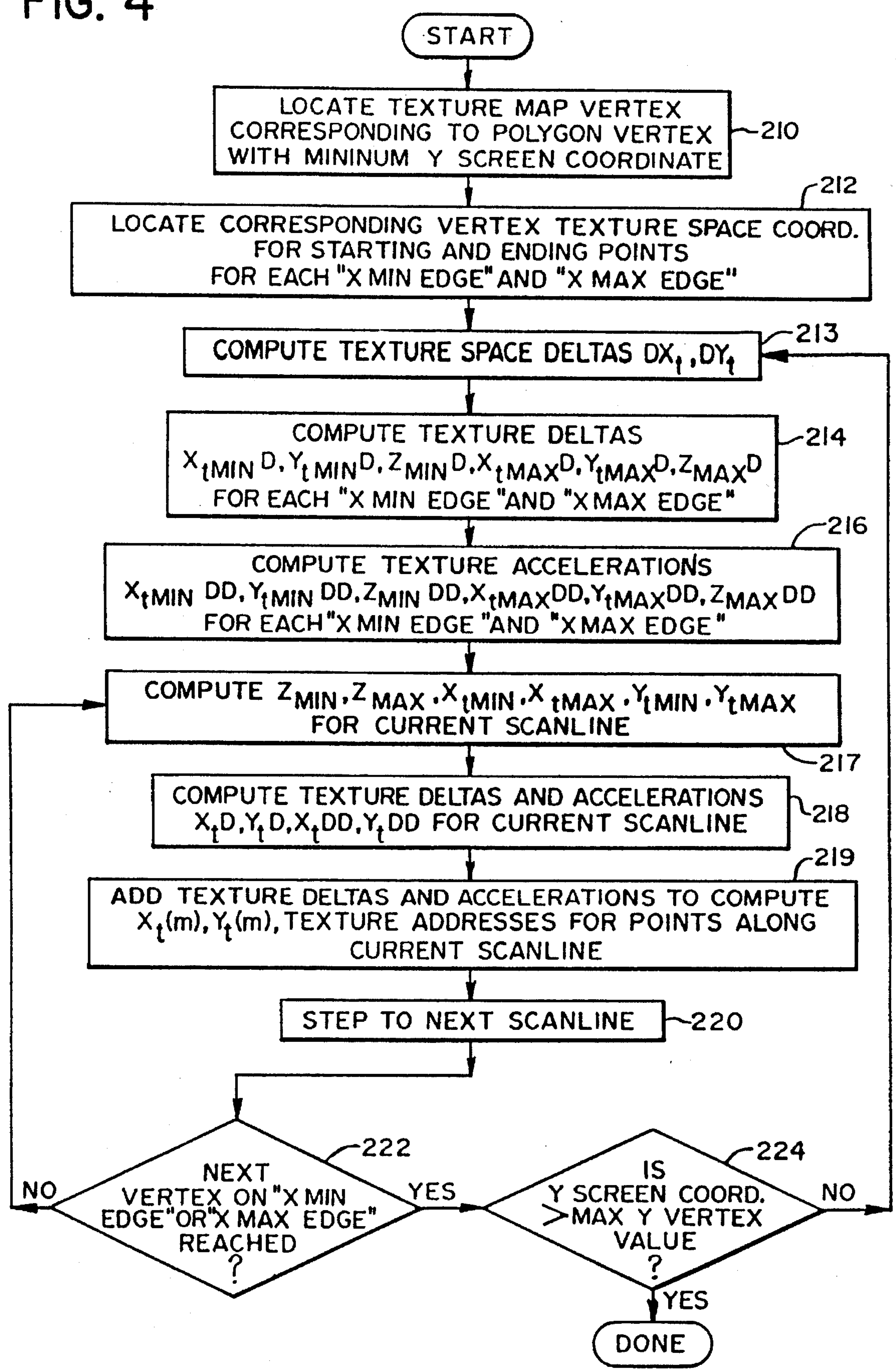
FIG. 4
START
LOCATE TEXTURE MAP VERTEX CORRESPONDING TO POLYGON VERTEX WITH MININUM Y SCREEN COORDINATE
210
LOCATE CORRESPONDING VERTEX TEXTURE SPACE COORD. FOR STARTING AND ENDING POINTS FOR EACH "X MIN EDGE" AND "X MAX EDGE"
212
COMPUTE TEXTURE SPACE DELTAS $DX_t$, $DY_t$
213
COMPUTE TEXTURE DELTAS $X_{tMIN}D$, $Y_{tMIN}D$, $Z_{MIN}D$, $X_{tMAX}D$, $Y_{tMAX}D$, $Z_{MAX}D$ FOR EACH "X MIN EDGE" AND "X MAX EDGE"
214
COMPUTE TEXTURE ACCELERATIONS $X_{tMIN}DD$, $Y_{tMIN}DD$, $Z_{MIN}DD$, $X_{tMAX}DD$, $Y_{tMAX}DD$, $Z_{MAX}DD$ FOR EACH "X MIN EDGE" AND "X MAX EDGE"
216
COMPUTE $Z_{MIN}$, $Z_{MAX}$, $X_{tMIN}$, $X_{tMAX}$, $Y_{tMIN}$, $Y_{tMAX}$ FOR CURRENT SCANLINE
217
COMPUTE TEXTURE DELTAS AND ACCELERATIONS $X_tD$, $Y_tD$, $X_tDD$, $Y_tDD$ FOR CURRENT SCANLINE
218
ADD TEXTURE DELTAS AND ACCELERATIONS TO COMPUTE $X_t(m)$, $Y_t(m)$, TEXTURE ADDRESSES FOR POINTS ALONG CURRENT SCANLINE
219
STEP TO NEXT SCANLINE
220
NEXT VERTEX ON "X MIN EDGE" OR "X MAX EDGE" REACHED ?
222
NO
YES
IS Y SCREEN COORD. >MAX Y VERTEX VALUE ?
224
NO
YES
DONE

TEXTURE SPACE
SCREEN SPACE
MINIMUM Y
MINIMUM X

THREE-DIMENSIONAL, TEXTURE MAPPING DISPLAY SYSTEM

BACKGROUND OF THE INVENTION

This invention relates generally to video games and more particularly, it relates to an improved three-dimensional, texture mapping display system for displaying three-dimensional projected polygons with texture maps on a two-dimensional raster display screen. In particular, the display system is adapted for use with video games to allow real-time animation of video game scenes with textured plane surfaces in a time period substantially less than that required in traditional display systems of this general type.

In the prior art display systems for displaying three-dimensional representations of images on a two-dimensional raster display screen of a cathode ray tube (CRT), it is generally desired to provide a mechanism for generating realistically textured surfaces in the image so that a general dimensional representational effect will be produced. In such conventional display systems for providing such an effect, this is achieved by some type of texture surface generator involving rather lengthy and complex arithmetic algorithms or mathematical computations to be performed, such as multiplication, division, addition, subtraction, and/or trigonometric function calculations.

Therefore, these prior art systems have a major disadvantage in that a user had to wait a considerable amount of time before the image could be displayed on the screen. Not only are the prior art display systems very time-consuming, the hardware circuits necessary to implement the various mathematical computations is very expensive.

Accordingly, it would therefore be desirable to provide an improved three-dimensional, texture mapping display system for displaying three-dimensional projected polygons with texture maps on a two-dimensional raster display screen which uses simplified algorithms involving only addition and subtraction operations and thus rendering a high operational speed.

SUMMARY OF THE INVENTION

Accordingly, it is a general object of the present invention to provide an improved display system for displaying three-dimensional projected polygons with texture maps in a time period substantially less than required in traditional display systems.

It is an object of the present invention to provide a three-dimensional, texture mapping display system which employs simplified arithmetic algorithms.

It is another object of the present invention to provide a three-dimensional, texture mapping display system which includes a graphic display processor that can be implemented with less expensive hardware circuits.

It is still another object of the present invention to provide a three-dimensional, texture mapping display system for displaying three-dimensional projected polygons with texture maps on a two-dimensional raster display screen which includes a graphics processor for determining destination addresses for each pixel in the screen space of a display monitor and for determining corresponding source addresses supplying surface texture to an image for each destination address.

It is yet still another object of the present invention to provide a display system which includes a graphics processor having look-up tables for storing approximate values relating to the depth coordinate ratios in screen space which are used in computation of source addresses in a texture memory.

In accordance with these aims and objectives, the present invention is concerned with the provision of a display system for displaying three-dimensional projected polygons with texture maps on a two-dimensional raster display screen which includes a host processor and a graphics processor. The host processor is responsive to input data from a host memory defining the vertices of a polygonal image that is to be displayed in a three-dimensional form on a raster display means for generating command signals, screen coordinates on the raster display means and corresponding texture space coordinates on a texture memory. The graphics processor is responsive to the command signals, screen coordinates and corresponding texture space coordinates for determining destination addresses for each pixel on the screen space of the raster display means and for determining corresponding source addresses supplying surface texture to the image for each destination address.

The graphics processor further includes a look-up table means for storing approximate values relating to depth coordinates ratios in screen space which are used to determine slope and acceleration values in texture space. As a result, the source addresses for the texture memory can be readily determined with simplified arithmetic algorithms using only addition operations.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is an overall block diagram of a three-dimensional, texture mapping display system, constructed in accordance with the principles of the present invention;

FIG. 2 is a detailed block diagram of the graphics co-processor for use in the present display system of FIG. 1;

FIG. 3 shows a flow chart, useful in the display system of the present invention, for generating destination addresses for each pixel on the screen space;

FIG. 4 shows a flow chart, useful in the display system of the present invention, for producing corresponding source addresses in the texture memory for each corresponding destination pixel.

DESCRIPTION OF THE PREFERRED EMBODIMENT

Figure 5:
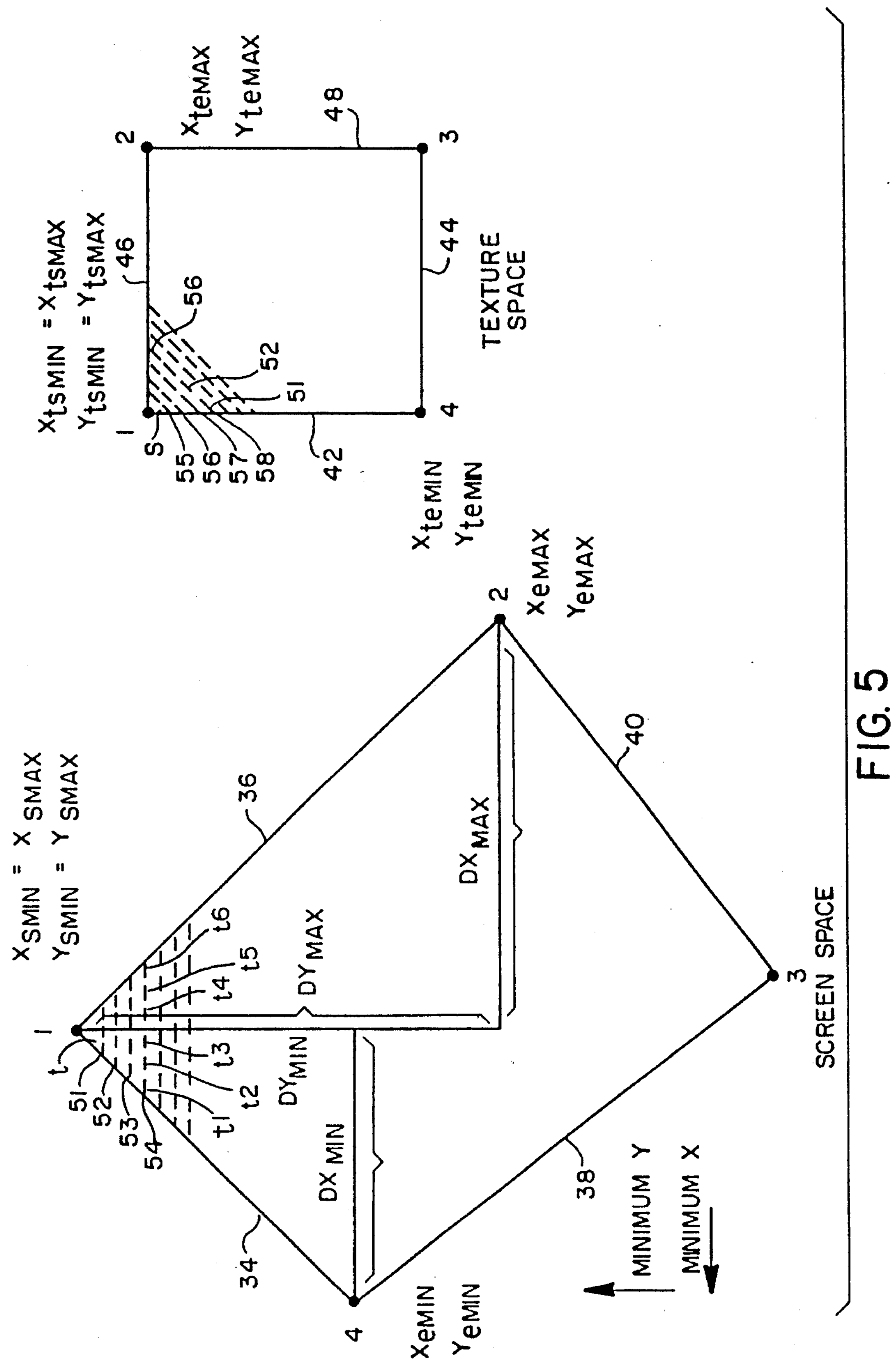
FIG. 5 shows a diagrammatical representation of an exemplary polygon on a bit map, filled with data from a texture map, formed in accordance with the processes of FIGS. 3 and 4.

Referring now in detail to the drawings, there is shown in FIG. 1 an overall block diagram of an improved three-dimensional, texture mapping display system 10 constructed in accordance with the principles of the present invention. The display system is used to display three-dimensional projected polygons with texture maps on a two-dimensional raster display device. The display system 10 is particularly adapted for use in video games to allow real-time animation of video game scenes with textured plane surfaces at a high speed of operation. The display system is comprised of a host computer 12 which is preferably a digital signal processor (DSP), a graphics co-processor 14, a texture memory 16, a video frame buffer 18, a color look-up table 20, and a cathode ray tube (CRT) or other display device 22.

The host computer 12 receives object data such as data from a suitable host memory 24 which defines the vertices of the polygonal image that is to be displayed in a three-dimensional image formed on the screen of the display device 22. The host memory also contains the addresses of the corresponding texture map in texture memory for each polygon.

As used herein, a polygon refers to a group of points, which lie on the same plane and describe the vertices of the bounding area of a convex two-dimensional space. A texture map refers to a two-dimensional image or picture which is represented by pixels. A bitmap is defined to be a two-dimensional RAM space that represents each pixel (color dot) that is displayed on the screen of the display device. In addition, a destination address means a memory location in the bitmap, and a source address means a memory location in the currently active texture map.

The host computer 12 receives from memory 24 a set of points which are represented by (X,Y,Z) in a reference (universe) rectangular coordinate system in three-dimensional space so as to describe the vertices of a polygon. The X represents the horizontal coordinate (left-right), the Y represents the vertical coordinate (up-down), and the Z represents the depth coordinate (front-back), respectively. Further, the host computer receives as inputs a set of points each represented by (Xt,Yt) in a rectangular coordinate system in two-dimensional space so as to describe the location of the vertices of a texture map. Since the polygon to be displayed on the screen of the CRT display device is to be shown relative to the viewpoint of a user, the host computer must initially perform a perspective transformation to convert the reference coordinates X,Y,Z for the set of points representing the vertices of the polygon to screen coordinates Xs, Ys, Zs as is well known in the art.

The graphics co-processor 14, according to the present invention, utilizes the screen coordinates to project the texture map onto the bitmap as represented by the video frame buffer 18 so that the texture map will look as though it were in perspective. However, since the polygon must be represented in two-dimensional space on the screen of the CRT display device, the screen coordinates Xs, Ys, Zs describing the vertices of the polygon must be first changed or projected to a two-dimensional X,Y coordinate, so that they may be plotted onto the bitmap. The projected X and Y coordinates of the polygon vertices are then used to determine the starting and ending plotting points for each scanline displayed on the bit map. The relationship between the Z coordinates at the starting and ending points is used to determine the mapping function from the texture map to the bitmap.

As can be seen from FIG. 2, there is a detailed block diagram of the graphics co-processor 14 of the present invention for processing of the input data in response to command signals from the host computer 12 so as to generate on the bitmap a polygon filled with data from the texture memory in the form which is synchronized with the Z coordinate values associated with each vertex. The graphics processor 14 includes an arithmetic logic unit (ALU) 25, look-up table 26 for supplying values of ZTABLED and ZTABLEDD, a screen address generator 28, a texture map address generator 30, and a data unit 32.

The ALU 25, in response to the input data from the host computer and the data from the look-up table 26 will generate the destination addresses via the screen address generator 28 for the video frame buffer 18. Each destination address determines a particular location on the screen at which texture data is to be placed. The ALU 25 also generates source addresses via the texture map address generator 28 for the texture memory 16. Each source address determines the specified texture data that is to be placed on the screen at the particular location determined by the corresponding destination address. The texture data is sent from the texture memory 16 to the data unit 32 and is then sent to the screen of the display unit 22 via the video frame buffer 18 and the color look-up table 20.

In the particular embodiment shown, the processing of information by the graphics co-processor 14 in response to the command signals from host computer 12 is also arranged so as to provide color index data with respect to the color and intensity of each point of the image for storage in the video frame buffer 18. The color index data acts as a "pointer" for selecting the required color and intensity from the look-up table 20 which then provides the suitable video color (red-green-blue) data to the CRT display device 22 for display. In the alternative an array of image color/intensity data for each image point can be stored directly in the video frame buffer 20 and such color/intensity data can be supplied directly to the CRT display device from the video frame buffer.

In order to display the polygon filled with data from the texture memory 16, it is initially required for the graphics co-processor 14 to generate the destination addresses corresponding to locations of each point (pixel) of the polygon on the screen space in accordance with the simplified flow chart depicted in FIG. 3. In block 110, the polygon vertex with the minimum Y screen coordinate is initially located. Then, the vertex screen coordinates of the starting and ending points for each of the outlines of the polygon, hereafter referred to as "Xmin edge" and "Xmax edge" are located in block 112. Next, there is computed in block 114 the screen deltas (delta X with respect to a change in Y of 1) and the Z ratios for each "Xmin edge" and "Xmax edge." The Z ratio is the ratio of the ending Z coordinate to the starting Z coordinate. Also computed in block 114 is the X slope between each scanline in screen space on each "Xmin edge" and "Xmax edge."

Then, the X, Y screen coordinates are set in the block 118 to the initial starting coordinates Xsmin, Ysmin. It should be understood that these are the starting coordinates for both "Xmin edge" and "Xmax edge." Then, in block 122 the X screen coordinate is increased by 1 repeatedly to plot the data from the texture memory 30 for each X screen coordinate until the "Xmax edge" is reached. In effect, this plots texture data from the left to the right edge of the current scan line of the polygon.

In block 124, it is determined whether the next vertex on either the "Xmin edge" or "Xmax edge" has been reached.

In block 126 the Y screen coordinate is increased by 1 in preparation for the next scan line. In addition , Xmin slope and Xmax slope are added to Xmin and Xmax respectively. Next, the block 128 determines whether the Y screen coordinate has exceeded a maximum Y vertex value. If so, then no further computations are made. If not then the computation in the block 118 is repeated for the next scanline. Therefore, the block 122 will again provide the destination addresses for the next scanline. It will be noted from the block 124 that if the next vertex has been reached, then a new X slope must be recomputed in block 114.

In order to determine the source pixel to plot, the graphics co-processor 14 must concurrently determine the corresponding addresses in the texture map 16 and supply the appropriate surface texture data as explained in connection with FIG. 4. In block 210, the texture map vertex corresponding to the polygon apex is initially located. Then, in block 212 the corresponding vertex texture space coordinates for starting and ending points for each "Xmin edge" and "Xmax edge" are located. The texture space deltas and texture deltas for the respective "Xmin edge" and "Xmax edge" are computed from blocks 213 and 214, respectively. Then, in block 216 there is computed the texture accelerations for the respective "Xmin edge" and "Xmax edge."

In blocks 217 and 218 Xt, Yt, $Z_{min}$, $Z_{max}$ the texture deltas and accelerations for the correct scan line are computed.

In block 219 the texture delta is added to the texture position to obtain $X_t(m)$, $Y_t(m)$ the texture addresses for points along the current scan line. In block 220 the next Xt, Yt, Zmin and Zmax texture values for the next scanline are computed. By adding the texture delta to the previous position and then adding the texture there is obtained the Xt(m), Yt(m) texture values for points along the scanline. Thus, the block 224 provides the source addresses for each pixel in the texture map. At 222 it is determined if a vertex or an edge has been reached. If not, a branch back to 217 occurs for the next scanline. If so, a check is done at 224 to determine if the Y screen coordinate has exceeded the maximum vertex value. If it has the routine ends otherwise it branches back to 213 for additional points on the current scanline.

An exemplary use of the procedure described above with reference to the flow charts of FIGS. 3 and 4 for processing of the input data to display a polygon filled with data from the texture map in its two-dimensional space on the bitmap, as illustrated in FIG. 5, will now be explained. Initially, it should be noted that the vertices (points 1–4) on the screen space are stored in a clockwise fashion. The vertex (point 1) has the minimum Y screen coordinate and is referred to as the "apex." Thus, the larger X coordinate vertex (point 2) is the next vertex going clockwise from the apex, and the smaller X coordinate is the vertex (point 4) going counter-clockwise from the apex. Consequently, the line 34 between the apex (point 1) and the vertex (point 4) with the minimum X coordinate is defined to be the "Xmin edge." The line 36 between the apex and the vertex (point 2) with the maximum X coordinate is defined to be the "Xmax edge."

For each "Xmin edge" (line 34 or 38), the vertex screen coordinates of the starting and ending points 1–4 and 4–3 are given by (Xsmin, Ysmin, Zsmin) and (Xemin, Yemin, Zemin), respectively. For each "Xmax edge" (line 36 or 40), the vertex screen coordinates of the starting and ending points (1–2 and 2–3) are given by (Xsmax, Ysmax, Zsmax) and (Xemax, Yemax, Zemax), respectively. It will be noted that for point 1: the values Xsmin=Xsmax, Ysmin=Ysmax, and Zsmin=Zsmax.

Therefore, there is defined:

Xsmin=starting vertex screen X value of min edge (1)

Ysmin=starting vertex screen Y value of min edge (2)

Zsmin=the starting Z value for the min edge in screen space (3)

Xemin=ending vertex screen X value of min edge (4)

Yemin=ending vertex screen Y value of min edge (5)

Zemin=the ending Z value for the min edge in screen space (6)

Xsmax=starting vertex screen X value of max edge (7)

Ysmax=starting vertex screen Y value of max edge (8)

Zsmax=the starting Z value for the max edge in screen space (9)

Xemax=ending vertex screen X value of max edge (10)

Yemax=ending vertex screen Y value of max edge (11)

Zemax=the ending Z value for the max edge in screen space (12)

The above equations (1) through (12) are processed in the block 112 of FIG. 3. Further, it will be noted that the corresponding vertices (points 1–4) in the texture space (FIG. 5) are also stored in a clockwise fashion so as to pair each screen space vertex with a corresponding texture space vertex. Then, for each "Xmin edge" (line 42 or 44), the vertex texture space coordinates of the starting and ending points (1–4 or 4–3) are given by (Xtsmin, Ytsmin) and (Xtemin, Ytemin), respectively. For each "Xmax edge" (line 46 or 48) the vertex texture space coordinates of the starting and ending points (1–2 or 2–3) are given by (Xtsmax, Ytsmax) and (Xtemax, Ytemax), respectively.

Therefore, there is defined:

Xtsmin=the starting X coord in texture space for min edge (13)

Ytsmin=the starting Y coord in texture space for min edge (14)

Xtsmax=the starting X coord in texture space for max edge (15)

Ytsmax=the starting Y coord in texture space for max edge (16)

Xtemin=the ending X coord in texture space for min edge (17)

Ytemin=the ending Y coord in texture space for min edge (18)

Xtemax=the ending X coord in texture space for max edge (19)

Ytemax=the ending Y coord in texture space for max edge (20)

For the above equations (13)–(20), these are processed concurrently with the FIG. 3 processing in block 212 of FIG. 4.

For each "Xmin edge" of the screen space, there are computed screen deltas which are given by:

DXmin=Xemin - Xsmin (delta screen X for min edge) (21)

DYmin=Yemin - Ysmin (delta screen Y for min edge) (22)

DZmin=Zemin - Zsmin (delta screen Z for min edge) (23)

Similarly, for each "Xmin edge" of the texture space, there are computed texture space deltas which are given by:

DXtmin=Xtemin-Xtsmin (delta X in texture space for Xmin edge) (24)

DYtmin=Ytemin-Ytsmin (delta Y in texture space for Xmin edge) (25)

There is also calculated for each "Xmin edge" a Z ratio value which is equal to:

ZRmin=Zemin/Zsmin (26)

For each "Xmin edge" of texture space, there are further calculated Z and associated texture deltas, and Z and associated texture accelerations which are given by:

Xtmin=Xtsmin (27)

XtminD=DXtmin * (ZTABLED(ZRmin,DYmin)) (28)

XtminDD=DXtmin * (ZTABLEDD(ZRmin,DYmin)) (29)

Ytmin=Ytsmin (30)

YtminD=DYtmin * (ZTABLED(ZRmin,DYmin)) (31)

YtminDD=DYtmin * (ZTABLEDD(ZRmin,DYmin)) (32)

Zmin=Zsmin (33)

ZminD=DZmin * (ZTABLED(ZRmin,DYmin)) (34)

ZminDD=DZmin * (ZTABLEDD(ZRmin,DYmin)) (35)

It will be noted that the texture delta XtminD in equation (28) above is equal to the texture space delta DXtmin from equation (24) multiplied by the value ZTABLED. Further, it will be noted that the texture acceleration XtminDD in equation (29) is equal to the same corresponding texture space delta DXtmin multiplied by a ZTABLEDD value. It can be seen that the ZTABLED and ZTABLEDD values are functions of ZRmin and DYmin. Similarly, the texture deltas YtminD and ZminD and the texture accelerations YtminDD and ZminDD shown in respective equations (31), (32), (34) and (35) are similarly related. The ZTABLED and ZTABLEDD values are stored as the Z-mapping functions in the look-up table 26 in FIG. 2. These values are stored approximations which simplify greatly the arithmetic algorithms required to be performed by the graphics co-processor 14.

More specifically, a fast, low cost algorithm was sought to approximate the hyperbolic function of inverse transformation texture mapping as more fully described in prior U.S. Pat. No. to Yan 4,615,013 and Bolton 4,343,037 herein by reference. An iterative approach which utilizes only additions to move between texture map pixels on a scanline is much preferred because it is computationally inexpensive and very fast.

It has been discovered that the actual hyperbolic mapping function can be approximated with a parabolic curve generated by successive additions (velocity and acceleration). This gives a reasonably accurate mapping for Z ratios between ⅓ and 3. Except in the case of extreme closeups or immense objects, virtually all polygons in real systems lie in this range.

The following formula was found to yield particularly good results for the delta (D) and acceleration (DD) values:

DD=(4–(8/(ZR+1)))/(DL*DL)

D=(1.0/DL)–((DL–1)*DD/2)

Where: ZR is the ratio of ending and starting Z coordinates of the destination line and DL is the number of samples in the destination line.

In the case of edge lines (Xmin, Xmax), DL is the number of scan lines spanned by the edge (DYmin, DYmax). In the case of an individual scan line, DL is the delta X value of the scanline (DX) which is equal to the number of pixels in the scanline.

In the preferred embodiment of this invention the DD and D values are stored in lookup tables ZTABLED, and ZTABLEDD respectively for a finite range of values of ZR and DL. This reduces calculations done on a per line basis, and results in most cases in a reasonably accurate approximation. For example to calculate XtminD and XtminDD in equations 28 and 29, ZR=ZRmin, and DL=DYmin. Even without the table lookup simplification, it should be noted that the per line computational overhead is vastly less than even the per pixel overhead of prior algorithms. The per pixel computational complexity of 4 additions is infinitesimal in relation to prior art algorithms.

For each "Xmin edge" of the screen space there is computed an X slope which is given by:

Xminslope=DXmin/DYmin (X slope between each scanline in screen space on Xmin edge) (36)

Likewise, for each "Xmax edge" of the screen space there are computed screen deltas which are given by:

DXmax=Xemax-Xsmax (delta screen X for max edge) (37)

DYmax=Yemax-Ysmax (delta screen Y for max edge) (38)

DZmax=Zemax-Zsmax (delta screen Z for max edge) (39)

Similarly, for each "Xmax edge" of the texture space, there are computed texture space deltas which are given by:

DXtmax=Xtemax-Xtsmax (delta X in texture space for Xmax edge) (41)

DYtmax=Ytemax-Ytsmax (delta Y in texture space for Xmax edge) (42)

There is also calculated for each "Xmax edge" a Z ratio value which is equal to:

ZRmax=Zemax/Zsmax (43)

For each "Xmax edge" of texture space, there are further calculated Z, texture deltas, and texture accelerations which are given by:

Xtmax=Xtsmax (44)

XtmaxD=DXtmax * (ZTABLED(ZRmax,Dymax)) (45)

XtmaxDD=DXtmax * (ZTABLEDD(ZRmax,DYmax)) (46)

Ytmax=Ytsmax (47)

YtmaxD=DYtmax , (ZTABLED(ZRmax,DYmax)) (48)

YtmaxDD=DYtmax * (ZTABLEDD(ZRmax,DYmax)) (49)

Zmax=Zsmax (50)

ZmaxD=DZmax * (ZTABLED(ZRmax,DYmax)) (51)

ZmaxDD=DZmax * (ZTABLEDD(ZRmax,DYmax)) (52)

Finally, for each "Xmax edge" of the screen space, there is computed an X slope which is given by:

Xmaxslope=DXmax/DYmax (X slope between each scanline in screen space on Xmax edge) (53)

From the above equations, there are generated what is sometimes referred to as "edge parameters" for the polygon to be drawn. In other words, there has been defined the vertex screen coordinates of the starting and end points along each "Xmin edge" and each "Xmax edge." Further, there has been defined the vertex texture space coordinates of the starting and ending points for each "Xmin edge" and each "Xmax edge." Next, the polygon is scanned out row by row in screen coordinates, starting with the row having the smallest Y coordinate value to the row with the maximum Y coordinate value. For each row, the X coordinate value is increased continuously each time by one across the particular row. Simultaneously, the texture map is scanned out in a similar and synchronized fashion in texture space coordinates. In order to effect such a scanning process, there must be computed for each scanline (n) the following:

| | | |
|---|---|---|
| Yscrn(n) = Yscrn(n − 1) + 1 | Y screen coord update | (54) |
| Xmin(n) = Xmin(n − 1) + XminBlOpe | X screen value for scanline start | (55) |
| Xmax(n) = Xmax(n − 1) + Xmaxslope | X screen value for scanline end | (56) |

-continued

| | | |
|---|---|---|
| Zmin(n) = Zmin(n − 1) + ZminD | Step starting Z on scanline | (58) |
| ZminD(n) = ZminD(n − 1) + ZminDD | Step ZminD | (59) |
| Xtmin(n) = Xtmin(n − 1) + XtminD | Step min edge texture map X | (60) |
| XtminD(n) = XtminD(n − 1) + XtminDD | Step XtminD | (61) |
| Ytmin(n) = Ytmin(n − 1) + YtminD | Step min edge texture map Y | (62) |
| YtminD(n) = YtminD(n − 1) + YtminDD | Step YtminD | (63) |
| Zmax(n) = Zmax(n − 1) + ZmaxD | Step ending Z on scanline | (64) |
| ZmaxD(n) = ZmaxD(n − 1) + ZmaxDD | Step ZmaxD | (65) |
| Xtmax(n) = Xtmax(n − 1) + XtmaxD | Step max edge texture map X | (66) |
| XtmaxD(n) = XtmaxD(n − 1) + XtmaxDD | Step XtmaxD | (67) |
| Ytmax(n) = Ytmax(n − 1) + YtmaxD | Step max edge texture map Y | (68) |
| YtmaxD(n) = YtmaxD(n − 1) + YtmaxDD | Step YtmaxD | (69) |
| ZR(n) = Zmax(n)/Zmin(n) | | (70) |
| DXt(n) = Xtsmax(n) = XtBmin(n) | Delta X scanline in texture space | (71) |
| DYt(n) = Ytsmax(n) = Ytsmin(n) | Delta Y scanline in texture space | (72) |
| Xt(0) = Xtmin(n) | | (73) |
| XtD(n) = DXt(n)*ZTABLED(ZR(n),DX(n))) | | (74) |
| XtDD(n)= DXt(n)*(ZTABLEDD(ZR(n),DX(n))) | | (75) |
| Yt(0) = Ytmin(n) | | (76) |
| YtD(n) = DYt(n)*(TABLED(ZR(n),DX(n))) | | (77) |
| YtDD(n)= DYt(n)*ZTABLEDD(Zr(n),DX(1n))) | | (78) |

Xt(0)=Xtmin(n) (73)
XtD(n)=DXt(n)*ZTABLED(ZR(n),DX(n))) (74)
XtDD(n)=DXt(n),(ZTABLEDD(ZR(n),DX(n))) (75)
Yt(0)=Ytmin(n) (76)
YtD(n)=DYt(n)*(TABLED(ZR(n),DX(n))) (77)
YtDD(n)=DYt(n)*ZTABLEDD(Zr(n),DX(1n)))

From the above, there are generated the destination and source addresses for the starting and ending of each scanline (n). For each pixel on a particular scanline (n), there are computed:

| | | |
|---|---|---|
| Xscrn(m) = xscrn(m − 1) + 1 | X screen coord for pixel m | (79) |
| Xt(m) = Xt(m − 1) + XtD(m − 1) | X texture map | (80) |
| XtD(m) = XtD(m − 1) + XtDD | | (81) |
| Yt(m) = Yt(m − 1) + YtD(m − 1) | Y texture map | (82) |
| YtD(m) = YtD(M − 1) + YtDD | | (83) |

It will be noted that the Y screen coordinate (Yscrn) remains the same for a particular scanline and the X screen coordinate (Xscrn) as defined in equation (79) is increased by 1 each time for the next pixel. The surface texture data accessed by the source addresses Xt(m) from respective equations (80) and (82) and Yt(m) in the texture memory 16 is then used to fill the location in the screen accessed by the destination addresses Xscrn(m) and Yscrn(n) for each pixel in the scanline (n).

As can be seen from equations (80) through (83), there is merely required four additions for computing the source address for each pixel m on the scanline n. For the next and each subsequent scanline, the above equations (54) through (78) must be recomputed. When the next vertex at the end of either "Xmin edge" line or "Xmax edge" line is reached, corresponding edge parameters must be recalculated before performing the scanline processing computations.

As can be seen from FIG. 5, a portion of the surface of the polygon is defined by points t along successive scanlines 51, 52, 53, 54 and so on from the Xmin edge line 34 to the Xmax edge 36 on the screen space. Similarly, the portion of the surface in the texture space is defined by points s along successive arcuate lines 55, 56, 57, 58 and so on from the Xmin edge 42 to the Xmax edge line 46. As can be seen, the exemplary points t1–t6 on the scanline 54 are linear while the corresponding points s1–s6 on the scanline 58 in texture space are not linear but curved. The reason for this is that the change in Z (depth coordinate) from one point to the next, in texture space, is not linear. The data from the point s1 in the texture space is used to fill the point t1 in screen space. Similarly, the surface texture data at the point s2 in the texture space is used to fill in the location t2 in the screen space and so on.

From the foregoing detailed description, it can thus be seen that the present invention provides an improved three-dimensional, texture mapping display system for displaying three-dimensional projected polygons with texture map on a two-dimensional raster display screen. The display system is comprised of a host computer and a graphics co-processor. A graphics co-processor is required to perform only simple arithmetic algorithms or mathematical computations in order to supply surface texture data to each destination pixel on the screen space of a CRT or other display device. A graphics co-processor includes a look-up table for storing Z-mapping functions which are used to simplify the calculations of delta and acceleration values in texture space for determining source addresses in a texture memory. This is the means by which the advantages of the present invention are implemented.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. In a display system adapted for use with video games to allow real-time animation of video games scenes with texture surfaces, said display system displaying three-dimensional projected texture mapped polygons on a two-dimensional display device having a screen composed of picture elements (pixels), said display system comprising:

a) host processing means responsive to input data from a host memory defining an overall image that is to be displayed in a three-dimensional form on a display device;

b) graphics co-processing means responsive to said host processing means for determining:

(i) destination addresses for each pixel on the screen of said display device and (ii) a corresponding source address from which surface texture data is supplied for each said pixel; and c) said graphics co-processing means including means for computing Z-mapping function values and delta and acceleration values therefrom, said graphics co-processing means using said delta and acceleration values to select said source addresses to display a reasonably accurate perspective of a three-dimensional texture mapped polygon on a two-dimensional display.

2. The display system of claim 1, wherein said Z-mapping function values are functions of screen deltas and a Z ratio.

3. The device according to claim 1 wherein the delta and acceleration values are determined from the formulas:

$$DD=(4-(8/(ZR+1)))/(DL^2)$$

$$D+(1/DL)-((DL-1)\ DD/2)$$

where ZR is the ratio of ending and starting Z coordinates of the destination line; DL is the number of samples in the destination line; DD is acceleration and D is delta.

4. The display system as claimed in claim 1, further comprising video frame buffer means for storing said destination source addresses from said graphics co-processor for directly supplying the same to said raster display device.

5. The display system as claimed in claim 1, further comprising video frame buffer means for storing said destination and source addresses for said graphics co-processor and for generating a color index data, and further including color lookup table means for storing color and intensity values and being responsive to said color index data for supplying color and intensity values to said raster display device.

6. A method adapted for use with video games to allow real-time animation of video games scenes with texture surfaces for displaying three-dimensional projected texture mapped polygons on a two-dimensional display device having a screen comprised of picture elements (pixels), said method comprising the steps of:

(a) providing a host processor for processing input data from a host memory defining an image to be displayed in a three-dimensional form on said two-dimensional display device;

(b) programming a graphics co-processor to:

(i) determine destination addresses for each pixel on the screen space of said display device, (ii) compute Z-mapping function values and delta and acceleration values therefrom and (iii) use said delta and acceleration values to select a source address from which surface texture data is supplied for each of said pixels, whereby a reasonably accurate perspective of a three-dimensional texture mapped polygon is displayed on said two-dimensional display.

7. The device according to claim 6 wherein the data and acceleration values are determined from the formulas:

$$DD=(4-(8/(ZR+1)))/(DL^2)$$

$$D+(1/DL)-((DL-1)\ DD/2)$$

where ZR is the ratio of ending and starting Z coordinates of the destination line; DL is the number of samples in the destination line; DD is acceleration and D is delta.

* * * * *